(12) United States Patent
Park et al.

(10) Patent No.: US 8,189,525 B2
(45) Date of Patent: May 29, 2012

(54) SOLUTION FOR INE/HO LB BOTTLE NECK

(75) Inventors: Sungki Park, Ashburn, VA (US); Durga P. Satapathy, Ashburn, VA (US); Walter Rausch, Shawnee, KS (US)

(73) Assignee: Clearwire IP Holdings LLC, Bellevue, WA (US)

( * ) Notice: Subject to any disclaimer, the term of this patent is extended or adjusted under 35 U.S.C. 154(b) by 405 days.

(21) Appl. No.: 12/488,271

(22) Filed: Jun. 19, 2009

(65) Prior Publication Data
US 2010/0322157 A1    Dec. 23, 2010

(51) Int. Cl.
*H04Q 7/00* (2006.01)
(52) U.S. Cl. .................. 370/329; 370/395.6; 455/450
(58) Field of Classification Search .................. 455/459; 370/329, 395.6, 469
See application file for complete search history.

(56) References Cited

U.S. PATENT DOCUMENTS

| | | | |
|---|---|---|---|
| 5,577,087 A | 11/1996 | Furuya | |
| 6,865,233 B1 | 3/2005 | Eriksson et al. | |
| 7,164,890 B2 | 1/2007 | Eriksson et al. | |
| 7,342,901 B1 | 3/2008 | Zhang et al. | |
| 2006/0034229 A1 | 2/2006 | Joo et al. | |
| 2006/0203712 A1 | 9/2006 | Lim et al. | |
| 2006/0268976 A1 | 11/2006 | Baum et al. | |
| 2007/0026881 A1 | 2/2007 | Tzavidas et al. | |
| 2007/0189211 A1 | 8/2007 | Awad et al. | |
| 2007/0258407 A1 | 11/2007 | Li et al. | |
| 2008/0112358 A1* | 5/2008 | Bennett | 370/329 |
| 2008/0137562 A1 | 6/2008 | Li et al. | |
| 2008/0144570 A1 | 6/2008 | Hsu et al. | |
| 2008/0219376 A1 | 9/2008 | Qi et al. | |

OTHER PUBLICATIONS

International Search Report and Written Opinion for PCT/US2010/034458 mailed Jul. 15, 2010, 12 pages.
International Search Report and Written Opinion for PCT/US2010/038395 mailed Aug. 11, 2010, 10 pages.

* cited by examiner

*Primary Examiner* — Phuoc Doan
(74) *Attorney, Agent, or Firm* — Pillsbury Winthrop Shaw Pittman LLP

(57) ABSTRACT

A system and method for reducing an initial network entry and/or handover (INE/HO) Link Budget (LB) Bottleneck in a communications network, for example, a Worldwide Interoperability for Microwave Access (WiMAX) network described in the IEEE 802.16 specification, is arranged such that a Base Station (BS) may allocate bandwidth with repetition across at least two frames on Initial Network Entry/Handover (INE/HO) by a Mobile Station. By doing so, the BS may achieve increased system gain on INE, while reducing the number of subchannels conventionally associated with repetition, thereby reducing the system noise floor during INE/HO.

26 Claims, 5 Drawing Sheets

SOLUTION FOR INE/HO LB BOTTLE NECK

CROSS-REFERENCE TO RELATED APPLICATIONS

This Application is related to co-pending U.S. patent application Ser. No. 12/474,872 filed on May 29, 2009, entitled "A Hybrid Scheme for DL Link Adaption," the entire contents of which are incorporated herein by reference.

BACKGROUND

This disclosure relates to a system and method for a solution for the INE/HO LB Bottleneck in a Worldwide Interoperability for Microwave Access (WiMAX) network.

In a WiMAX communications network, a base station (BS) may communicate with a mobile station (MS) on a communication channel. During Initial Network Entry/Handover (INE/HO), which occurs when the MS initially enters the communications network, the MS and the BS exchange initiating communications such as, for example, Subscriber Station Basic Capabilities Request (SBC-REQ) and/or Ranging Request (RNG-REQ) messages. The initiating communications may be used in order to establish the communications channel. Because the initiating communications each require transmission of data, sub-channels of the communications network are allocated to transmit the data. Thus, high demands may be imposed on a given BS of a WiMAX network, especially when high volumes of MSs attempt INE/HO (such as when multiple vehicles having WiMAX receivers or passengers with WiMAX receivers enter a WiMAX hotspot) because INE/HO requires data to be transmitted over the communications network.

Transmission of data/communications between the MS and the BS are described by a Link Budget (LB). The LB represents the gains and losses of transmission from the BS (or other transmitter) to the MS (or other receiver). System gain is a measure the Radio Frequency (RF) output of the BS and the practical limit of receiving RF output by the MS. Various factors may affect the system gain such as, for example, noisiness of a communication channel that decreases system gain and number of sub-channels used during communications (a higher number of sub-channels increases noisiness). During transmission of communications between the BS and the MS, enhanced system gain may be desirable. Various methods by which system gain is enhanced have been developed, such as, for example, Hybrid Automatic Repeat Request (HARQ).

However, while HARQ may be used for a communication channel once the MS has entered the network, HARQ is unavailable for transmission of initiating communications such as SBC-REQ and RNG-REQ during INE/HO. Thus, system gain is typically lower during conventional INE/HO as compared to when communications have already been established between the MS and the BS. As such, existing systems suffer from a LB bottleneck during INE/HO. This may lead to, for example, increased system loads as multiple MSs attempt INE/HO, which may be problematic where high volumes of MSs may enter a WiMAX communications network via a BS.

These and other drawbacks exist.

SUMMARY

According to various embodiments of this disclosure, a system and method may be used to implement a solution for initial network entry and/or handover (INE/HO) Link Budget (LB) Bottleneck in a communications network. The communications network may be a WiMAX network described in the IEEE 802.16 specification. The BS may allocate bandwidth with repetition across at least two frames on Initial Network Entry/Handover (INE/HO) by the MS. By doing so, the BS reduces the number of subchannels conventionally associated with repetition, thereby reducing noise floor during INE/HO and thus achieving increased system gain on INE. Bandwidth may be allocated across more than two frames, as desired or required by the system requirements.

A MS may send the BS a bandwidth allocation request for INE/HO. The BS may allocate bandwidth, as discussed above, for the MS to provide the BS with initiation communication information such as, for example, a Subscriber Station Basic Capability Request (SBC-REQ) and/or Ranging Request (RNG-REQ) message. Each of the at least two frames may include a lesser number of slots (i.e., require less bandwidth) as compared to existing systems that use a single frame with repetition for receiving the initiation communication information. The MS may segment the initiation communication into at least a first portion and at least a second portion to be transmitted to the BS on each of the at least two frames. The MS may also perform headroom checking in order to perform power boosting on each frame.

Thus, the system may use at least half the number of slots in each of the at least two frames (and therefore decrease the number of subchannels used), and/or perform power boosting at each of the at least two frames when initiating network entry by the MS. By doing so, the system and method may be used to decrease the noise floor, perform power boosting and improve system gain during INE/HO (as compared to without implementing the system and method during INE/HO), thereby addressing the bottleneck on the LB during INE/HO by the MS.

DETAILED DESCRIPTION

According to various embodiments of this disclosure, a system and method may be used to implement a solution for initial network entry and/or handover (INE/HO) Link Budget (LB) Bottleneck in a WiMAX Network described in the IEEE 802.16 specification. The BS may receive a bandwidth request from an MS attempting to initiate entry into a communications network via the BS. In response to the bandwidth request, the BS may allocate bandwidth across at least two frames for the MS to provide the BS with initiation communication information such as, for example, a Subscriber Station Basic Capability Request (SBC-REQ) and/or Ranging Request (RNG-REQ) message. Each of the at least two frames may include a lesser number of slots (i.e., require less bandwidth) as compared to existing systems that use a single frame with repetition for receiving the initiation communication information. The MS may segment the initiation communication into at least a first portion and at least a second portion to be provided to the BS on each of the at least two frames. The MS may also perform headroom checking in order to perform power boosting on each frame. The initiation communication may be segmented into more than two frames.

Thus, the system may use a reduced number of slots in each of the at least two frames and/or perform power boosting at each of the at least two frames when initiating network entry by the MS, as compared to existing systems. By doing so, the system and method may be used to decrease the number of subchannels used, thereby decreasing the noise floor, and may perform power boosting to improve system gain during INE/HO (as compared to without implementing the system and method during INE/HO). Accordingly, the system and method may address the bottleneck described above on the Link Budget during INE/HO by the MS.

Figure 1:
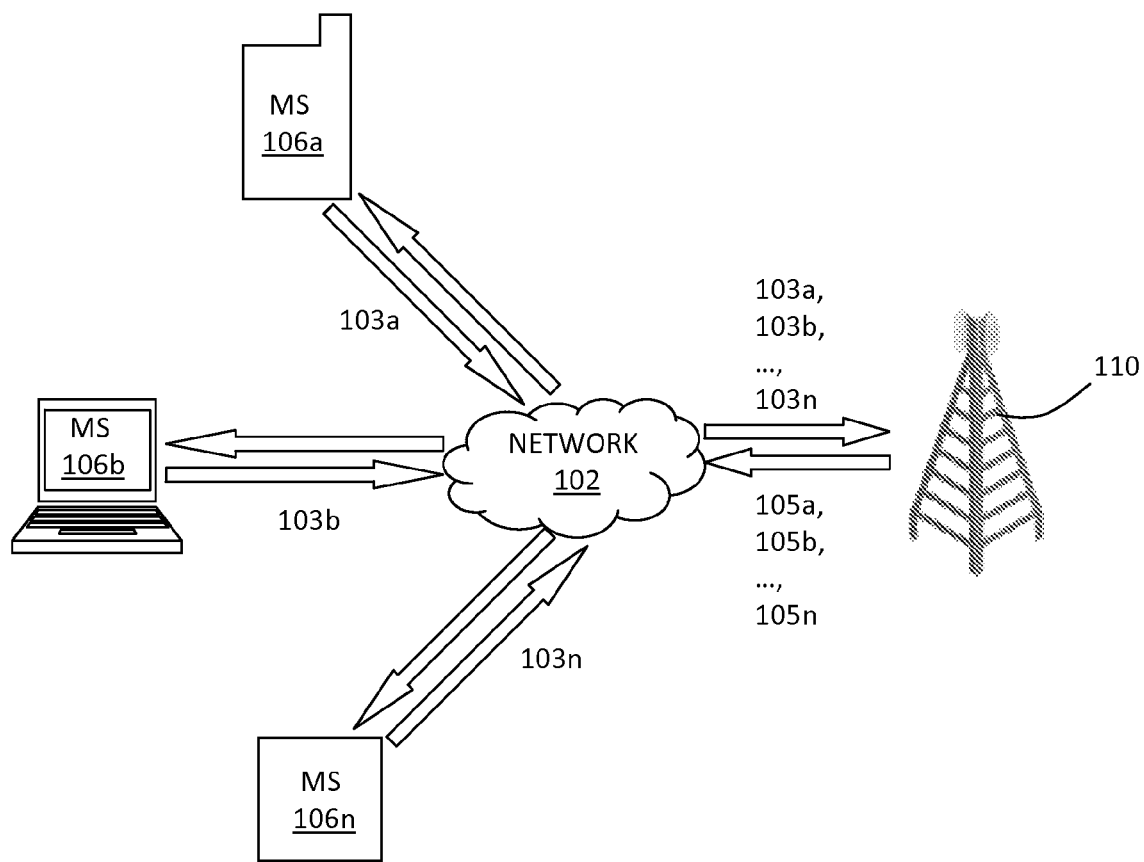
FIG. 1 is a block diagram that illustrates an example of a system of a solution for INE/HO LB Bottleneck according to an embodiment of the disclosure.

FIG. 1 is a block diagram that illustrates an example of a system 100 of a solution for INE/HO LB Bottleneck according to an embodiment of the disclosure. System 100 may include, among other things, BS 110 communicably coupled on respective communication channels (not shown) to MS 106a, MS 106b, . . . , MS 106n (hereinafter "MS 106" for convenience) via network 102. MS 106 may provide communications 103a, 103b, . . . , 103n (hereinafter "communications 103" for convenience) to BS 110, and BS 110 may provide communications 105a, 105b, . . . , 105n (hereinafter "communications 105" for convenience) to MS 106.

For example, communications 103 may include, among other things, a bandwidth request and initiation communications (such as, for example, a SBC-REQ message and/or a RNG-REQ message). In particular, when entering network 102 via BS 110, MS 106 may communicate a bandwidth request to BS 110. During initiation of network entry, MS 106 may provide initiation communications to BS 110 that may, for example, include information related to the capabilities of MS 106 and ranging information.

Communications 105 may include, among other things, bandwidth allocation data to MS 106. For example, BS 110 may respond to the bandwidth request with an Uplink Map (UL MAP) that may define burst start times for time division multiplex and/or time division multiple access by MS 106. MS 106 may use the UL MAP in order to map bits of data on one or more slots of a frame when providing data to BS 110.

Figure 2:
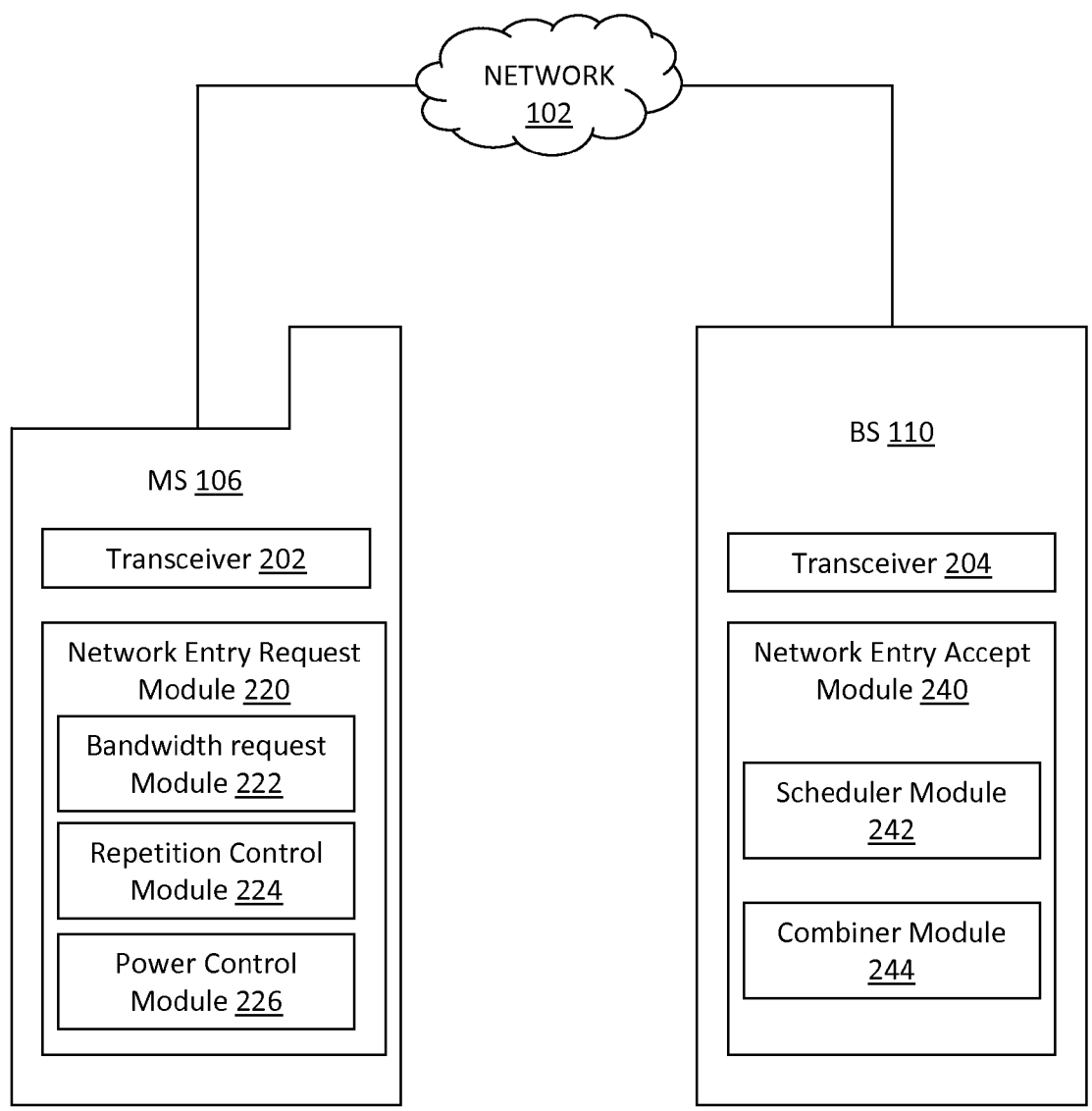
FIG. 2 is a block diagram that illustrates an example BS that is communicably coupled via a network to a MS, where the BS and the MS implement a solution for INE/HO LB Bottleneck according to an embodiment of the disclosure.

FIG. 2 is a block diagram that illustrates an example BS 110 that is communicably coupled via network 102 to MS 106, where BS 110 and MS 106 implement a solution for INE/HO LB Bottleneck according to an embodiment of the disclosure.

According to various embodiments of this disclosure, MS 106 may include, among other things, transceiver 202 and network entry request module 220. MS 106 may use transceiver 202 to transmit to and receive communications from BS 110, for example. Through various modules, network entry request module 220 may request, initiate, and/or otherwise manage entry into network 102 via BS 110. For example, network entry request module 220 may include, among other things, bandwidth request module 222, repetition control module 224, and power control module 226. Bandwidth request module 222 may generate a bandwidth request for communications with BS 110. The bandwidth request, which may be generated when initiating entry into network 102, is a request for bandwidth allocation to BS 110 for communications on one or more communication channels.

According to various embodiments of this disclosure, repetition control module 224 may receive a bandwidth allocation from BS 110. The received bandwidth allocation may include a number of slots that is equivalent to an allocation of slots without repetition (e.g., the received bandwidth allocation may include substantially half the number of slots as compared to when bandwidth is allocated with repetition) on a single frame. Thus, in one or more embodiments, initiation communications may be provided to BS 110 using two frames, assuming the foregoing bandwidth allocation. For example, if SBC and RNG message sizes are 60 bytes, and if repetition=2 is applied for an SBC message, the total number of bytes of SBC are going to be 60×2=120 bytes. With QPSK1/2, UL slot capacity is 6 bytes per slot. The maximum number of slots per subchannel is 5 slots. For example, half of 120 bytes, i.e., 60 bytes, is transmitted in one frame. Two subchannels per frame, i.e., 10 slots, are required to be allocated (6 bytes per slot×5 slots per subchannel=30 bytes per subchannel) for the first subchannel, and another 5 slots for the second subchannel. The same concept may be applied for the RNG message. Thus, because the number of allocated slots may be reduced as compared to existing systems when providing initiation communications, repetition control module 224 may segment the initiation communication so that the initiation communication does not exceed the bandwidth allocated by BS 110 on a first frame.

In particular, network entry request module 220 may transmit at least a first portion of the segmented communication on the first frame allocated by BS 110. Upon allocation of a bandwidth allocation on at least a second frame, repetition control module 224 may transmit a second, different portion of the segmented communication on the second frame allocated by BS 110. Thus, by segmenting an initiation communication and transmitting the segmented communication over at least two frames allocated by BS 110, the number of subchannels required to transmit the initiation communication is reduced as compared to transmitting the initiation communication over a single frame, for example, thereby decreasing the noise floor and increasing system gain.

According to various embodiments of this disclosure, power control module 226 may determine or otherwise receive the headroom to determine whether sufficient headroom exists for power boosting. If sufficient headroom exists, power control module 226 may perform power boosting at either or both of the first frame and second frame (and/or any other frame as appropriate). If sufficient headroom does not exist, power control module 226 may perform repetition of SBC-REQ and/or RNG-REQ across the first and second frames. In this manner, network entry request module 220 may enhance system gain by performing power boosting at either or both of the first and second frames as appropriate.

In operation, MS 106 may transmit a bandwidth request to BS 110. MS 106 may receive bandwidth allocation on a first frame that includes half the number of slots in the first frame as compared to a bandwidth allocation in a frame with repetition=2. Because bits of the SBC-REQ (and/or RNG-REQ) message may exceed bandwidth allocation in the first frame as a result of the reduced number of slots, for example, MS 106 may segment the bits of the SBC-REQ message into a first portion and a second portion such that a combination of the first portion and the second portion may be used to recreate the SBC-REQ message. MS 106 may repeat bits after modulation, when bits are mapped on slots of the frame. MS 106 may transmit the first portion using the first frame. MS 106 may receive a second bandwidth allocation on a second frame that includes half the number of slots as discussed above. MS 106 may transmit the second portion of the SBC-REQ message using the second frame. In other words, MS 106 may perform repetition on two frames by segmenting the initiation communication into the first portion and the second portion. In this manner, the number of subchannels (per frame) used to transmit the SBC-REQ message is reduced, because the number of allocated slots is reduced, thereby lowering the noise floor and improving system gain. It should be noted that, although illustrated as halving the number of slots, the bandwidth allocation on first, second, or other frames may include other reductions in number of slots.

According to various embodiments of this disclosure, BS 110 may include, among other things, transceiver 204 and network entry accept module 240. BS 110 may use transceiver 204 to transmit to and receive communications from MS 106, for example. Through various modules, network entry accept module 240 may manage entry of MS 106 into network 102. For example, network entry accept module 240 may include, among other things, scheduler module 242 and combiner module 244. Scheduler module 242 may receive a bandwidth request from MS 106. In response to the bandwidth request, scheduler module 242 may allocate bandwidth for communication with MS 106.

In particular, scheduler and link adaptation module 242 (hereafter "scheduler module 242") may assign repetition for initial entry of MS 106 into network 102. As previously noted, repetition conventionally requires more subchannels as compared to no repetition, which increases noise floor and reduces system gain. Thus, scheduler module 242 may assign repetition for initial entry of MS 106 on at least two frames, each frame having a reduced number of slots, thereby using less subchannels and resulting in less noise as compared to repetition. In an embodiment of the disclosure, BS 110 applies "QPSK 1/2, rep=2" (QPSK encoding with two repetitions), for SBC-REQ and/or RNG-REQ during INE/HO across at least two frames. In a particular embodiment of the disclosure, at least two frames are consecutive frames. More than two frames may be used in the case where rep>2.

According to various embodiments of the disclosure, combiner module 244 may receive a first portion of an initiation communication from MS 106 on the first frame and may receive a second portion of an initiation communication from MS 106 on the second frame as allocated by scheduler module 242. Combiner module 244 may expect the first frame and the second frame based on the allocated bandwidth by scheduler module 242. In other words, combiner module 244 may be operatively coupled to scheduler module 242 such that combiner module 244 is aware of the bandwidth allocation scheme used by scheduler module 242. Upon receiving a first portion of the initiation communication on the first frame and receiving a second portion of the initiation communication on the second frame, combiner module 224 may combine the first portion and the second portion and perform demodulation and decoding on the combined first and second portion.

In operation, BS 110 may receive a bandwidth request from MS 106. In response to the request, BS 110 may apply QPSK 1/2, rep=2, for SBC-REQ and/or RNG-REQ during INE/HO allocating data slots across at least two frames. By doing so, BS 110 may reduce the number of slots in a given frame and decrease the number of subchannels for a given frame, thereby decreasing the noise floor and increasing system gain. In a particular embodiment, at least two frames may be consecutive frames. In other words, BS 110 may allocate bandwidth width with repetition on a first frame and a second frame. BS 110 may receive a first portion (e.g., a first block of bits) of a SBC-REQ and/or RNG-REQ message in the first frame and a second portion (e.g., a second block of bits) of a repeated SBC-REQ and/or RNG-REQ message in the second frame. BS 110 may combine the first portion and the second portion, then demodulate and decode the SBC-REQ and/or RNG-REQ message. By doing so, BS 110 allocates bandwidth to MS 106 in a manner that increases system gain by using repetition across at least two frames, thereby reducing the number of slots per frame to be used during INE.

Figure 3:
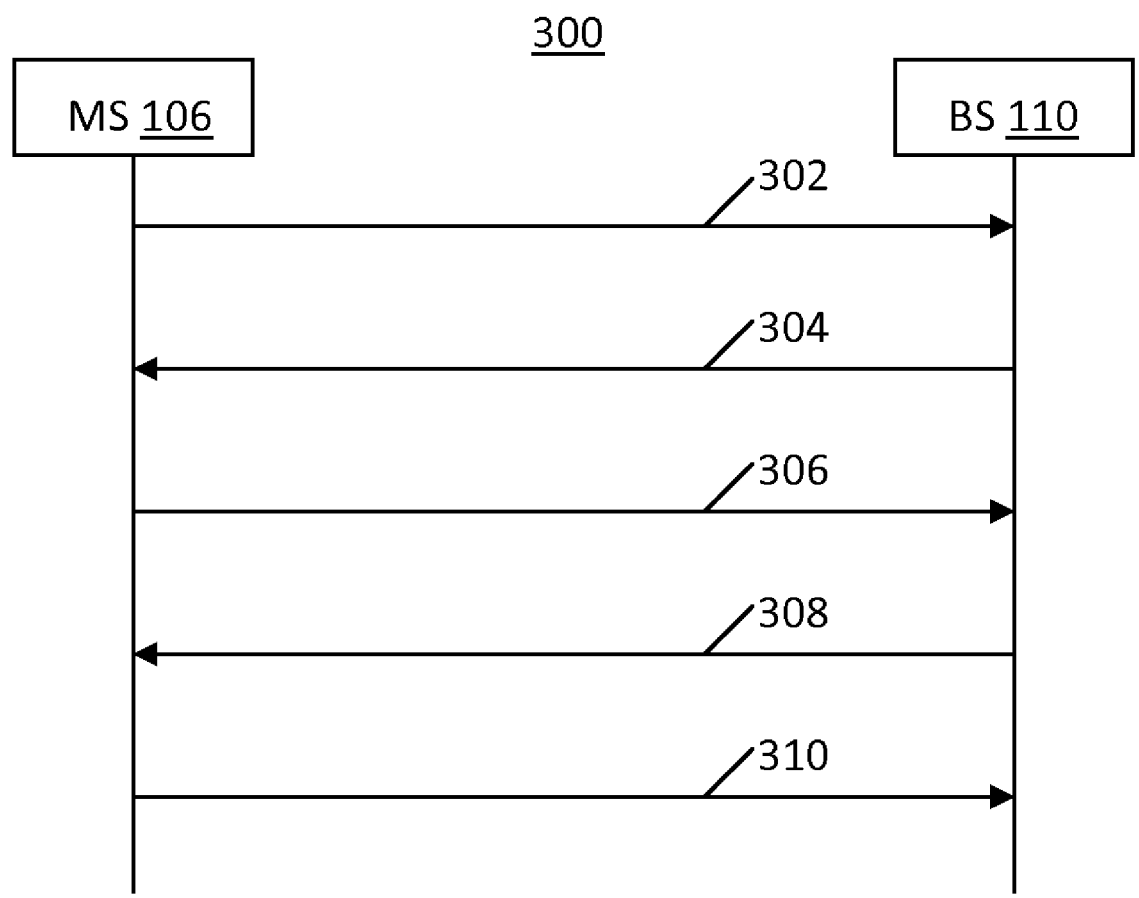
FIG. 3 is a data flow diagram illustrating data flow between a mobile station and a base station for initial entry of a mobile station into a communications network when implementing a solution for INE/HO LB Bottleneck according to an embodiment of the disclosure.

FIG. 3 is a data flow diagram 300 illustrating data flow between MS 106 and BS 110 for initial entry of MS 106 into communications network 102 when implementing a solution for INE/HO LB Bottleneck according to an embodiment of the disclosure. According to various embodiments of the disclosure, MS 106 may transmit a bandwidth request 302 to enter network 102 (not shown in FIG. 3) via BS 110. In response, BS 110 may provide a first UL MAP 304 indicating an allocation of uplink bandwidth with repetition that includes a first number of slots in a first one of at least two frames. The first number of slots is equal to a number of slots of uplink bandwidth without repetition (i.e., the first number of slots is less than the number of slots with repetition on a single frame). MS 106 may perform repetition on bits of data (such as SBC-REQ and/or RNG-REQ) after the modulation. MS 106 may transmit a first portion of repeated bits 306 to BS 110 in the first frame. Prior to transmission, MS 106 may perform headroom checking such that if headroom is sufficient, MS 106 performs power boosting if power is available.

BS 110 may receive the first portion 306 and allocate a second UL MAP 308 indicating a second bandwidth allocation in a second frame. MS 106 transmits the second portion 310 of the repeated bits to BS 110 in the second frame. Prior to transmission, MS 106 may perform headroom checking such that, if headroom is sufficient, MS 106 performs power boosting, if power is available. BS 110 may receive and combine second portion 310 with first portion 306 for decoding.

Figure 4:
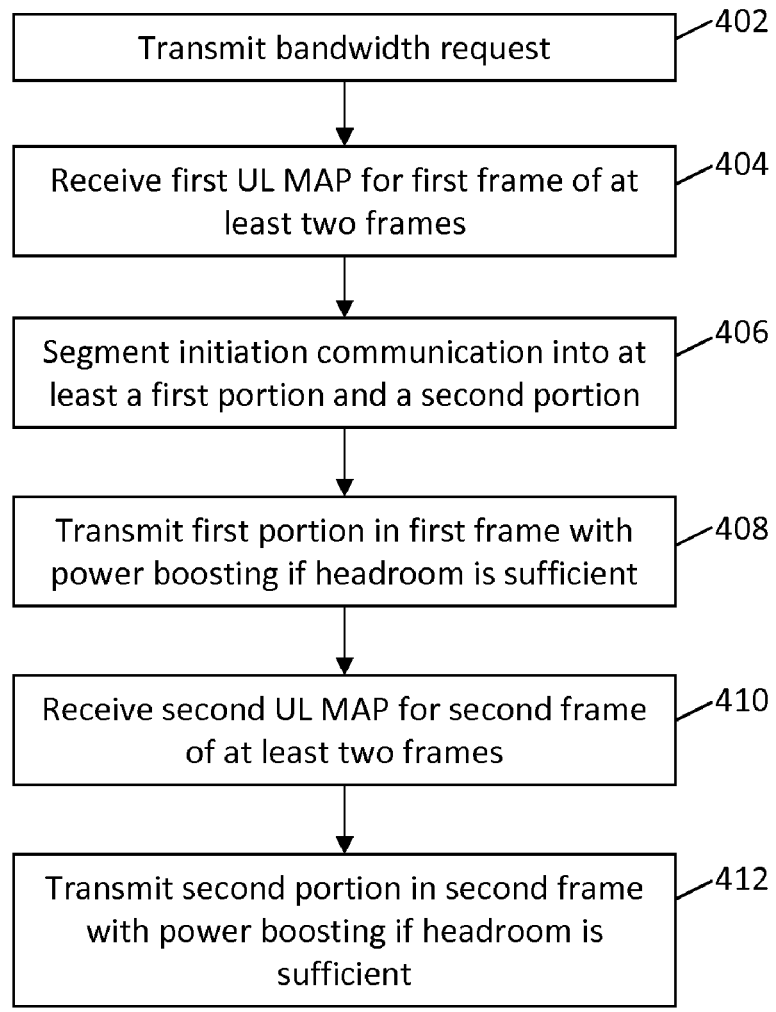
FIG. 4 is a flow diagram illustrating an example process for initiating communication with a base station by a mobile station when implementing a solution for INE/HO LB Bottleneck according to an embodiment of the disclosure.

FIG. 4 is a flow diagram illustrating an example process 400 for initiating communication with BS 110 by MS 106 when implementing a solution for INE/HO LB Bottleneck according to an embodiment of the disclosure. The various processing operations depicted in the flow diagram of FIG. 4 (and in the other drawing figures) are described in greater detail herein. The described operations for a flow diagram may be accomplished using some or all of the system components described in detail above and, in some embodiments, various operations may be performed in different sequences. In other embodiments, additional operations may be performed along with some or all of the operations shown in the depicted flow diagrams. In yet other embodiments, one or more operations may be performed simultaneously. Accordingly, the operations as illustrated (and described in greater detail below) are examples by nature and, as such, should not be viewed as limiting.

According to various embodiments of this disclosure, in operation 402, process 400 may transmit a bandwidth request that is generated when initiating entry into network 102. When initiating entry, initiation communications may be exchanged between MS 106 and BS 110, for example. Initiation communications may include, among other things, a SBC-REQ and/or RNG-REQ message. In operation 404, process 400 may receive a first UL MAP that indicates bandwidth allocation with repetition on a first one of at least two frames. The received bandwidth allocation may include a capacity of slots on the first frame that is equivalent to an allocation of slots on a frame without repetition (e.g., the received bandwidth allocation may include substantially half the number of slots as compared to when bandwidth is allocated with repetition on a single frame). In one or more embodiments, initiation communications may be provided using two frames using the foregoing bandwidth allocation. Thus, because the number of allocated slots, for example, may be reduced as compared to existing systems when providing initiation communications, operation 406 may segment the initiation communication into at least a first portion and a second portion so that the initiation communication does not exceed the bandwidth allocated on the first frame. Initiation communications may be provided using more than two frames, depending on particular system requirements and/or loading.

In operation 408, the first portion of the initiation communications may be transmitted in the first frame. If sufficient headroom exists, the initiation communications may be transmitted in the first frame with power boosting. In operation 410, process 400 may receive a second UL MAP that indicates a second bandwidth allocation on a second one of at least two frames. In operation 412, process 400 may transmit the second portion in the second frame. If sufficient headroom exists, the second portion of the initiation communications may be transmitted with power boosting. Thus, process 400 may be used to reduce the number of subchannels and decrease the noise floor, thereby improving signal gain during INE/HO. By performing power boosting when there exists sufficient headroom in the at least two frames, signal gain may further be enhanced.

Figure 5:
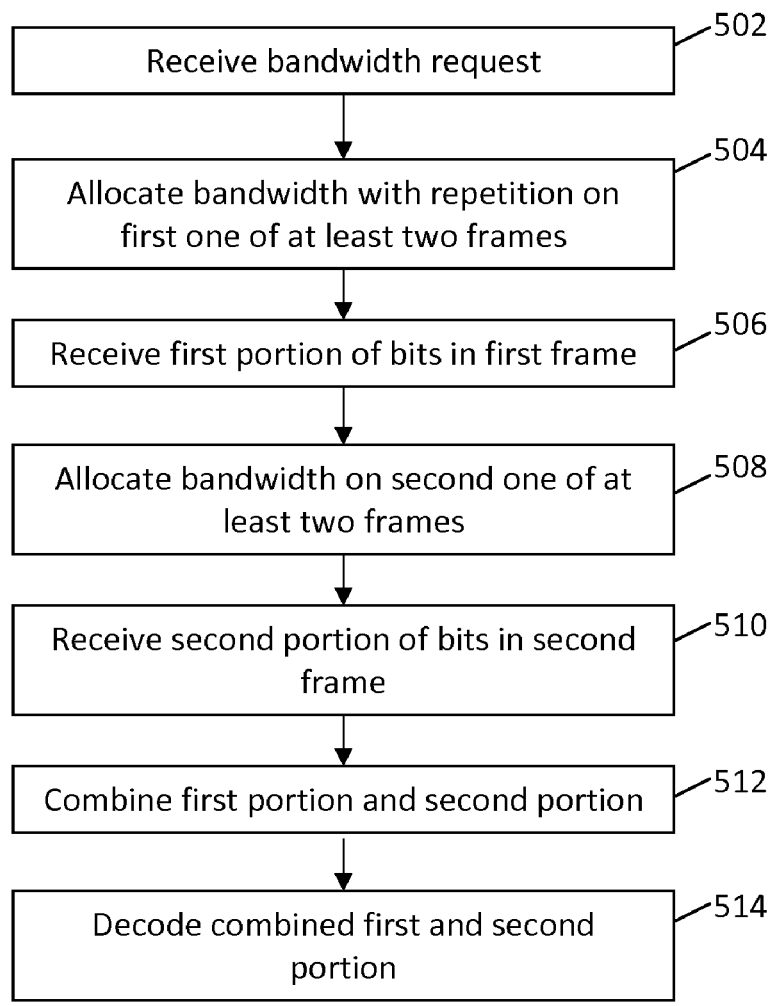
FIG. 5 is a flow diagram illustrating an example process of a base station allocating bandwidth and managing entry of a mobile station into a network via the base station when implementing a solution for INE/HO LB Bottleneck according to an embodiment of the disclosure.

FIG. 5 is a flow diagram illustrating an example process 500 of BS 110 allocating bandwidth and managing entry of MS 106 into network 102 via BS 110 when implementing a solution for INE/HO LB Bottleneck according to an embodiment of the disclosure. According to various embodiments of the disclosure, in operation 502, process 500 may receive a bandwidth request. In response to the bandwidth request, in operation 504, a first bandwidth allocation with repetition across a first one of at least two frames may be made. By allocating bandwidth with repetition across at least two frames, the number of subchannels (across the at least two frames) is reduced as compared to repetition across one frame, thereby reducing the noise floor and increasing system gain during INE/HO. In operation 506, a first portion of bits may be received in the first frame from MS 106. The bits may be bits of data that include initiation communications such as, for example, SBC-REQ and RNG-REQ messages. Process 500 may expect a second portion of bits in a subsequent second frame because process 500 indicated an allocation of bandwidth with repetition across two frames in operation 504. In operation 508, a second bandwidth allocation may be made in a second one of the at least two frames. In operation 510, the second portion of bits may be received in the second frame. In operation 512, the first portion and the second portion may be combined. In operation 514, the combined first and second portions may be decoded. For example, the combined first and second may be decoded into the initiation communications. By allocating bandwidth in a manner that reduces the number of slots (for example) during INE, process 500 may increase system gain during INE.

Examples of MS 106 may include any one or more of, for instance, a personal computer, portable computer, personal digital assistant (PDA), workstation, web-enabled mobile phone, WAP device, web-to-voice device, or other device. Those having skill in the art will appreciate that the embodiments described herein may work with various system configurations.

In addition, various embodiments of the disclosure may be made in hardware, firmware, software, or any suitable combination thereof. Embodiments of the disclosure may also be implemented as instructions stored on a machine-readable medium, which may be read and executed by one or more processors. A machine-readable medium may include any mechanism for storing or transmitting information in a form readable by a machine (e.g., a computing device). For example, a machine-readable storage medium may include read only memory, random access memory, magnetic disk storage media, optical storage media, flash memory devices, and others. Further, firmware, software, routines, or instructions may be described herein in terms of specific example embodiments of the disclosure, and performing certain actions. However, it will be apparent that such descriptions are merely for convenience and that such actions in fact result from computing devices, processors, controllers, or other devices executing the firmware, software, routines, or instructions.

Various embodiments described herein are describe as including a particular feature, structure, or characteristic, but every aspect or embodiment may not necessarily include the particular feature, structure, or characteristic. Further, when a particular feature, structure, or characteristic is described in connection with an embodiment, it will be understood that such feature, structure, or characteristic may be included in connection with other embodiments, whether or not explicitly described. Thus, various changes and modifications may be made to the provided description without departing from the scope or spirit of the disclosure.

For example, although illustrated as part of BS 110, network entry accept module 240 may be part of BS 110 or separate from BS 110 so long as BS 110 is associated with or otherwise accesses functions of network entry accept module 240. Furthermore, transceivers 202 and 204 may be separate receivers and transmitters (not shown), without departing from the scope of this disclosure.

Other embodiments, uses and features of the present disclosure will be apparent to those skilled in the art from consideration of the specification and practice of the inventive concepts disclosed herein. The specification and drawings should be considered exemplary only, and the scope of the disclosure is accordingly intended to be limited only by the following claims.

What is claimed is:

1. A Base Station (BS) for addressing a link budget bottleneck when at least one Mobile Station (MS) enters a communications network via the BS, the BS comprising:
a network entry accept module associated with the base station, the network entry accept module comprising one or more processors configured to:
receive a bandwidth request from the at least one MS that is attempting to enter the communications network via the BS;
allocate first uplink bandwidth in at least one first frame in response to the bandwidth request, the first uplink bandwidth to be used to receive initiation communication information from the MS, wherein the initiation communication information is used for initial entry by the MS into the communications network;
receive a first portion of the initiation communication information from the MS on the at least one first frame;

allocate second uplink bandwidth in at least one second frame;
receive a second portion of the initiation communication information from the MS on the at least one second frame;
combine the first portion and the second portion of the initiation communication information; and
decode the initiation communication information using the first portion and the second portion, whereby use of the at least one first frame and the at least one second frame addresses the link budget bottleneck.

2. The base station of claim 1, wherein the initiation communication information includes a subscriber station basic capabilities request (SBC-REQ).

3. The base station of claim 1, wherein the initiation communication information includes ranging request (RNG-REQ).

4. The base station of claim 1, wherein the one or more processors of the network entry accept module are further configured to allocate the first uplink bandwidth and to allocate the second uplink bandwidth by taking into account repetition.

5. The base station of claim 1, wherein the one or more processors of the network entry accept module are further configured to:
generate a first uplink map for the at least one first frame, the first uplink map indicating a plurality of first slots of the at least one first frame, where each of the plurality of first slots includes uplink bandwidth that is equivalent to a slot without repetition.

6. The base station of claim 5, wherein the one or more processors of the network entry accept module are further configured to:
generate a second uplink map for the at least one second frame, the second uplink map indicating a plurality of second slots of the at least one second frame, where each of the plurality of second slots includes uplink bandwidth that is equivalent to a slot without repetition.

7. The base station of claim 1, wherein the at least one first frame and the at least one second frame are immediately adjacent frames.

8. The base station of claim 1, wherein the at least one first frame and the at least one second frame have one or more intervening frames between them.

9. A Mobile Station (MS) for addressing a link budget bottleneck when the MS enters a communications network via at least one Base Station (BS), the mobile station comprising:
a network entry request module comprising one or more processors configured to:
transmit a bandwidth request to the at least one BS;
receive a first allocation of first uplink bandwidth in at least one first frame;
segment initiation communication information into at least a first portion and at least a second portion, wherein the initiation communication information is used to initially enter the communications network;
perform first headroom checking to determine whether sufficient headroom exists for power boosting on the at least one first frame;
transmit, to the BS, the first portion on the at least one first frame;
receive a second allocation of second uplink bandwidth in at least one second frame; and
transmit, to the BS, the second portion on the at least one second frame.

10. The mobile station of claim 9, wherein the one or more processors of the network entry request module are further configured to:
perform first power boosting on the at least one first frame when sufficient headroom exists on the at least one first frame.

11. The mobile station of claim 10, wherein the one or more processors of the network entry request module are further configured to:
perform second headroom checking to determine whether sufficient headroom exists for power boosting on the at least one second frame; and
perform second power boosting on the at least one second frame when sufficient headroom exists on the at least one second frame.

12. A system for addressing a link budget bottleneck when a mobile station (MS) enters a communications network via at least one Base Station (BS), the system comprising:
at least one base station configured to:
receive a bandwidth request from the at least one MS that is attempting to enter the communications network via the BS;
allocate first uplink bandwidth in at least one first frame in response to the bandwidth request, the first uplink bandwidth to be used to receive initiation communication information from the MS, wherein the initiation communication information is used for initial entry by the MS into the communications network;
receive a first portion of the initiation communication information from the MS on the at least one first frame;
allocate second uplink bandwidth in at least one second frame;
receive a second portion of the initiation communication information from the MS on the at least one second frame;
combine the first portion and the second portion of the initiation communication information; and
decode the initiation communication information using the first portion and the second portion, whereby use of the at least one first frame and the at least one second frame addresses the link budget bottleneck; and
at least one mobile station configured to:
transmit a bandwidth request to the at least one BS;
receive a first allocation of first uplink bandwidth in at least one first frame;
segment initiation communication information into at least a first portion and at least a second portion, wherein the initiation communication information is used to initially enter the communications network;
transmit to the BS the first portion on the at least one first frame;
receive a second allocation of second uplink bandwidth in at least one second frame; and
transmit to the BS the second portion on the at least one second frame.

13. A computer-implemented method of addressing a link budget bottleneck when at least one Mobile Station (MS) enters a communications network via a base station, the method comprising:
receiving, by one or more processors of a network entry accept module associated with the BS, a bandwidth request from the at least one MS that is attempting to enter the communications network via the BS;
allocating first uplink bandwidth in at least one first frame in response to the bandwidth request, the first uplink bandwidth to be used to receive initiation communication information from the MS, wherein the initiation communication information is used for initial entry by the MS into the communications network;

receiving, by the one or more processors of the network entry accept module, a first portion of the initiation communication information from the MS on the at least one first frame;

allocating, by the one or more processors of the network entry accept module, second uplink bandwidth in at least one second frame;

receiving, by the one or more processors of the network entry accept module, a second portion of the initiation communication information from the MS on the at least one second frame;

combining, by the one or more processors of the network entry accept module, the first portion and the second portion of the initiation communication information; and decoding, by the one or more processors of the network entry accept module, the initiation communication information using the first portion and the second portion, whereby use of the at least one first frame and the at least one second frame addresses the link budget bottleneck.

14. The method of claim 13, wherein the initiation communication information includes a subscriber station basic capabilities request (SBC-REQ).

15. The method of claim 13, wherein the initiation communication information includes ranging request (RNG-REQ).

16. The method of claim 13, further comprising:
allocating, by the one or more processors of the network entry accept module, the first uplink bandwidth; and
allocating, by the one or more processors of the network entry accept module, the second uplink bandwidth by taking into account repetition.

17. The method of claim 13, further comprising:
generating, by the one or more processors of the network entry accept module, a first uplink map for the at least one first frame, the first uplink map indicating a plurality of first slots of the at least one first frame, where each of the plurality of first slots includes uplink bandwidth that is equivalent to a slot without repetition.

18. The method of claim 17, further comprising:
generating, by the one or more processors of the network entry accept module, a second uplink map for the at least one second frame, the second uplink map indicating a plurality of second slots of the at least one second frame, where each of the plurality of second slots includes uplink bandwidth that is equivalent to a slot without repetition.

19. The method of claim 13, wherein the at least one first frame and the at least one second frame are immediately adjacent frames.

20. The method of claim 13, wherein the at least one first frame and the at least one second frame have one or more intervening frames between them.

21. A computer-implemented method for addressing a link budget bottleneck when a mobile station enters a communications network via at least one Base Station (BS), the method comprising:

transmitting, by one or more processors of a network entry request module, a bandwidth request to the at least one BS;

receiving, by the one or more processors of a network entry request module, a first allocation of first uplink bandwidth in at least one first frame;

segmenting, by the one or more processors of a network entry request module, initiation communication information into at least a first portion and at least a second portion, wherein the initiation communication information is used to initially enter the communications network;

transmitting, by the one or more processors of a network entry request module, to the BS the first portion on the at least one first frame;

receiving, by the one or more processors of a network entry request module, a second allocation of second uplink bandwidth in at least one second frame; and transmitting, by the one or more processors of a network entry request module, to the BS the second portion on the at least one second frame.

22. The method of claim 21, further comprising:
performing, by the one or more processors of a network entry request module, first headroom checking to determine whether sufficient headroom exists for power boosting on the at least one first frame; and
performing, by the one or more processors of a network entry request module, first power boosting on the at least one first frame when sufficient headroom exists on the at least one first frame.

23. The method of claim 22, wherein the one or more processors of the network entry request module are further configured to:
performing, by the one or more processors of a network entry request module, second headroom checking to determine whether sufficient headroom exists for power boosting on the at least one second frame; and
performing, by the one or more processors of a network entry request module, second power boosting on the at least one second frame when sufficient headroom exists on the at least one second frame.

24. A computer-implemented method for addressing a link budget bottleneck when a mobile station (MS) enters a communications network via at least one Base Station (BS), the method comprising:

receiving a bandwidth request from the at least one MS that is attempting to enter the communications network via the BS;

allocating, by the BS, first uplink bandwidth in at least one first frame in response to the bandwidth request, the first uplink bandwidth to be used to receive initiation communication information from the MS, wherein the initiation communication information is used for initial entry by the MS into the communications network;

receiving, by the BS, a first portion of the initiation communication information from the MS on the at least one first frame;

allocating, by the BS, second uplink bandwidth in at least one second frame;

receiving, by the BS, a second portion of the initiation communication information from the MS on the at least one second frame;

combining, by the BS, the first portion and the second portion of the initiation communication information;

decoding, by the BS, the initiation communication information using the first portion and the second portion, whereby use of the at least one first frame and the at least one second frame addresses the link budget bottleneck;

transmitting, by the MS, a bandwidth request to the at least one BS;

receiving, by the MS, a first allocation of first uplink bandwidth in at least one first frame;

segmenting, by the MS, initiation communication information into at least a first portion and at least a second portion, wherein the initiation communication information is used to initially enter the communications network;

transmitting, by the MS, to the BS the first portion on the at least one first frame;

receiving, by the MS, a second allocation of second uplink bandwidth in at least one second frame; and transmitting, by the MS, to the BS the second portion on the at least one second frame.

25. An article of manufacture comprising a non-transitory computer-readable storage medium containing computer-executable instructions therein which, when executed by a processor arranged in a Base Station (BS), cause the processor to carry out functions related to reducing a link budget bottleneck when at least one Mobile Station (MS) enters a communications network via the BS, the functions comprising:

receiving a bandwidth request from the at least one MS that is attempting to enter the communications network via the BS;

allocating a first uplink bandwidth in at least one first frame in response to the bandwidth request, the first uplink bandwidth being used to receive initiation communication information from the MS, wherein the initiation communication information is used for initial entry by the MS into the communications network;

receiving a first portion of the initiation communication information from the MS on the at least one first frame;

allocating a second uplink bandwidth in at least one second frame;

receiving a second portion of the initiation communication information from the MS on the at least one second frame;

combining the first portion and the second portion of the initiation communication information; and decoding the initiation communication information using the first portion and the second portion, wherein use of the at least one first frame and the at least one second frame reduces the link budget bottleneck.

26. An article of manufacture comprising a non-transitory computer-readable storage medium containing executable instructions therein which, when executed by processor arranged in a Mobile Station (MS), cause the processor to carry out functions related to reducing a link budget bottleneck when the MS enters a communications network via a Base Station (BS), the functions comprising:

transmitting a bandwidth request to the BS;

receiving a first allocation of first uplink bandwidth in at least one first frame;

segmenting initiation communication information into at least a first portion and at least a second portion, wherein the initiation communication information is used to initially enter the communications network;

performing first headroom checking to determine whether sufficient headroom exists for power boosting on the at least one first frame;

performing first power boosting on the at least one first frame when sufficient headroom exists on the at least one first frame;

transmitting, to the BS, the first portion on the at least one first frame;

receiving a second allocation of second uplink bandwidth in at least one second frame; and transmitting, to the BS, the second portion on the at least one second frame.

* * * * *